United States Patent
Kim et al.

(10) Patent No.: US 10,801,555 B2
(45) Date of Patent: Oct. 13, 2020

(54) WEAR COMPENSATION DEVICE OF A CLUTCH ACTUATOR

(71) Applicants: Hyundai Motor Company, Seoul (KR); Kia Motors Corporation, Seoul (KR)

(72) Inventors: Jong Min Kim, Busan (KR); In Tae Park, Hwaseong-si (KR); Jinwoo Lee, Dongsong-eup, Cheorwon-gun (KR); Euihee Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 16/192,680

(22) Filed: Nov. 15, 2018

(65) Prior Publication Data

US 2020/0032859 A1 Jan. 30, 2020

(30) Foreign Application Priority Data

Jul. 25, 2018 (KR) .......... 10-2018-0086531

(51) Int. Cl.
*F16D 13/75* (2006.01)
*F16D 23/14* (2006.01)
*F16D 125/40* (2012.01)

(52) U.S. Cl.
CPC .......... *F16D 13/752* (2013.01); *F16D 23/14* (2013.01); *F16D 2023/141* (2013.01); *F16D 2125/40* (2013.01)

(58) Field of Classification Search
CPC ...... F16H 13/75; F16H 13/752; F16H 13/757; F16C 1/22; F16D 23/14; F16D 2023/141; F16D 2125/40
See application file for complete search history.

(56) References Cited

U.S. PATENT DOCUMENTS 5,816,379 A * 10/1998 De Briel ............... F16D 13/757
192/70.252
2017/0058967 A1* 3/2017 Ley ........................ F16D 13/757

FOREIGN PATENT DOCUMENTS

| JP | 4254303 B2 | 4/2009 |
| KR | 10-1181073 B1 | 9/2012 |
| KR | 10-2016-0001668 A | 1/2016 |
| KR | 10-1601482 B1 | 3/2016 |

* cited by examiner

*Primary Examiner* — Charles A Fox
*Assistant Examiner* — Lori Wu
(74) *Attorney, Agent, or Firm* — Morgan, Lewis & Bockius LLP

(57) ABSTRACT

A wear compensation device of a clutch actuator may include a screw movable along a longitudinal direction of a pull-rod axially received in the screw, a screw guider holding the screw to allow movement in the longitudinal direction and having a connection pin connected to a link member, a compensation nut supported by the screw guider, engaged with the screw, and having catching teeth, a compensation ring externally coupled with the compensation nut, having a catching protrusion to be locked with the catching teeth in one direction thereof, and having a guide pin on an external circumference of the compensation ring, and a guide block fixed to a housing, having a guide groove to receive the guide pin, and guiding the guide pin to rotate the compensation ring when the pull-rod is operated to a wear compensation range.

9 Claims, 5 Drawing Sheets

WEAR COMPENSATION DEVICE OF A CLUTCH ACTUATOR

CROSS-REFERENCE TO RELATED APPLICATION

The present application claims priority to Korean Patent Application No. 10-2018-0086531 filed on Jul. 25, 2018, the entire contents of which is incorporated herein for all purposes by this reference.

BACKGROUND OF THE INVENTION

Field of the Invention

The present invention relates to a clutch actuator.

Description of Related Art

Generally, an automated manual transmission (AMT) or a dual clutch transmission (DCT) operates a clutch by a clutch actuator to connect or disconnect torque transmission.

When wear exceeds a certain amount, such a clutch actuator is recommended to ensure operability of a clutch by maintaining a clutch stroke within a certain range by a wear compensation device.

A wear compensation device may be disposed in a clutch actuator to compensate wear by a predetermined operation during an operation of the clutch actuator.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a wear compensation device of a clutch actuator having advantages of stably removing play by wear of a clutch.

A wear compensation device according to an exemplary embodiment of the present invention may include a compensation screw, a screw guider, a wear compensation nut, a wear compensation ring, and at least one rotation guide block. The compensation screw is disposed in a housing to be movable along a longitudinal direction of a pull-rod that penetrates the compensation screw and operates the clutch according to a driving unit of the clutch actuator. The screw guider holds the compensation screw to allow movement in the longitudinal direction thereof, receives the pull-rod penetrating through the screw guider, and may include a connection pin connected to a link member connected to the driving unit at both transverse end portions of the screw guider. The wear compensation nut is supported by the screw guider, screw-engaged with the compensation screw, and may include catching teeth of a saw-tooth shape formed along an external circumference of the wear compensation nut. The wear compensation ring is formed as a annular shape, coupled with the external circumference of the wear compensation nut, may include a plurality of catching protrusions formed on an internal circumference of the wear compensation ring to form a locked state with the catching teeth in one circumferential direction thereof, and may include at least one rotation guide pin on an external circumference of the wear compensation ring. The at least one rotation guide block is fixed to an internal surface of the housing, may include a rotation guide groove on an internal side of the rotation guide block to receive the at least one rotation guide pin, and guides the at least one rotation guide pin to rotate the wear compensation ring when the pull-rod is operated to a wear compensation range.

A support ring may be coupled with each of both sides of the wear compensation nut to support the wear compensation ring in a width direction of the support ring.

The support ring may be screw-engaged with each of both sides of the wear compensation nut.

The plurality of catching protrusions may be formed in a number greater than or equal to two on an internal circumference of the wear compensation ring.

The plurality of catching protrusions may protrude in an angle that matches wide tooth surfaces of the catching teeth on the wear compensation nut.

An internal surface of the rotation guide block may be formed as a curved surface corresponding to an external circumference of the wear compensation ring.

The rotation guide groove may include a straight range facilitating the wear compensation ring to be rotationally fixed, and a slant range guiding the wear compensation ring to rotate.

The slant range of the rotation guide groove may form an angle with the straight range such that, when the rotation guide pin travels along the slant range, the catching protrusions of the wear compensation ring is rotated by one pitch of the catching teeth of the wear compensation nut.

According to an exemplary embodiment of the present invention, play by wear of a clutch may be stably removed by linearly moving a compensation screw by one-directionally rotating a wear compensation nut by an interaction between saw-tooth shaped catching teeth formed on the wear compensation nut and a catching protrusion formed on the wear compensation ring.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
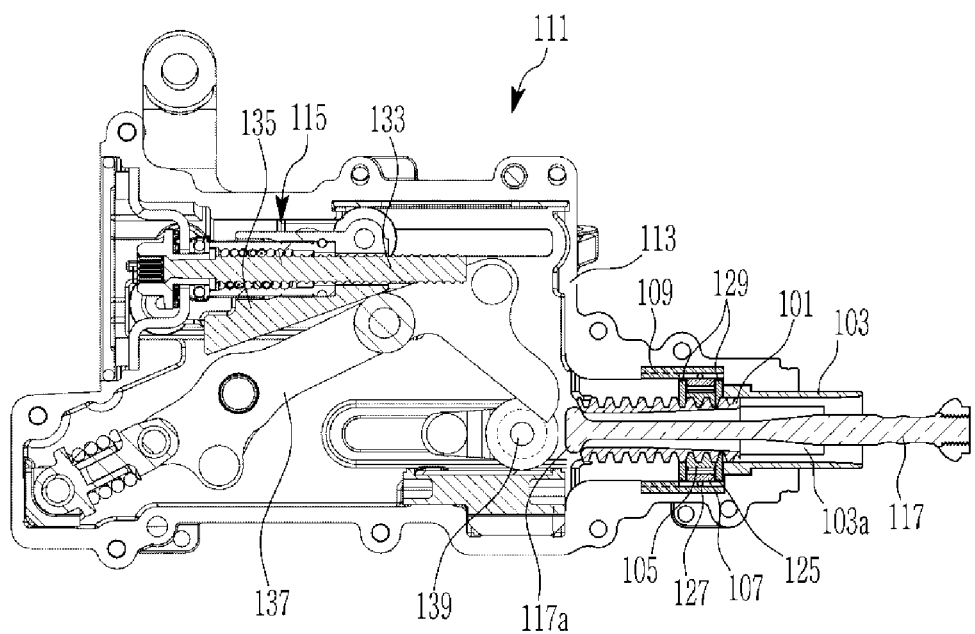
FIG. 1 is a cross-sectional view of a clutch actuator applied with a wear compensation device according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

The drawings and description are to be regarded as illustrative in nature and not restrictive.

Figure 2:
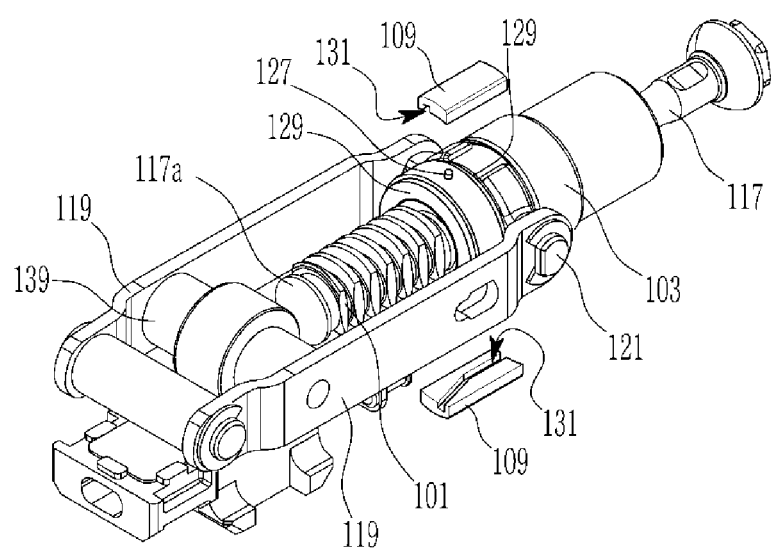
FIG. 2 is a perspective view of a wear compensation device according to an exemplary embodiment of the present invention in an assembled state.
Figure 3:
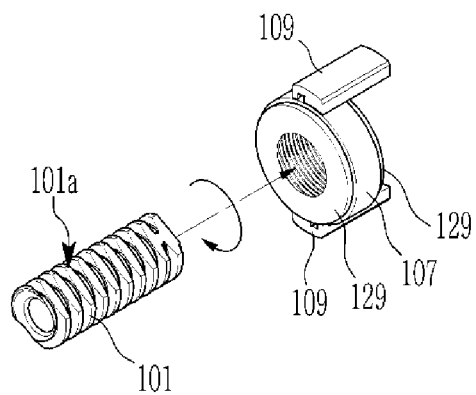
FIG. 3 is an exploded perspective view of a wear compensation device according to an exemplary embodiment of the present invention.
Figure 4:
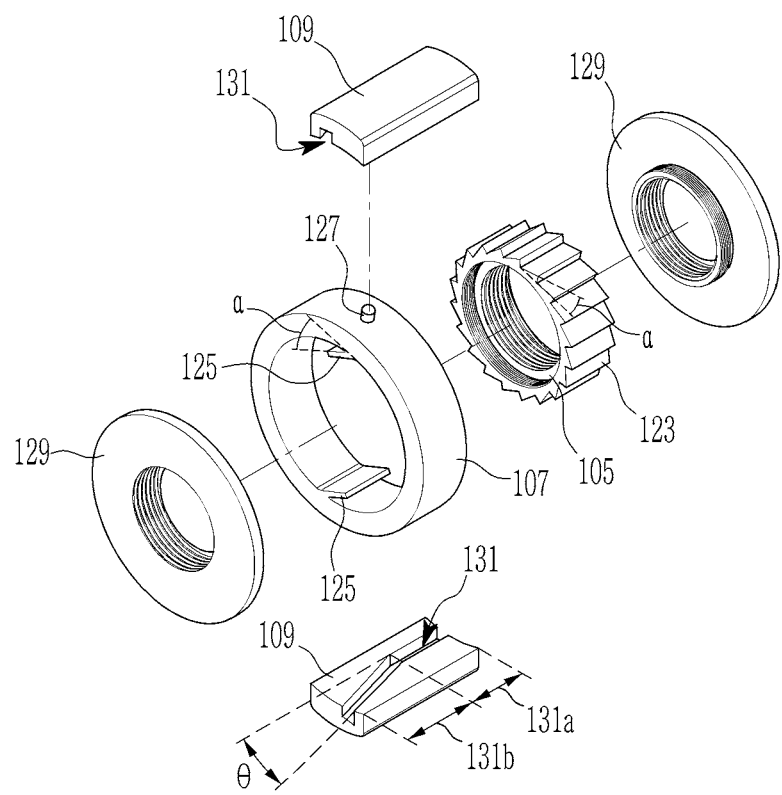
FIG. 4 is an exploded perspective view of principal parts of a wear compensation device according to an exemplary embodiment of the present invention.

FIG. 1 is a cross-sectional view of a clutch actuator applied with a wear compensation device according to an exemplary embodiment of the present invention. FIG. 2 is a perspective view of a wear compensation device according to an exemplary embodiment of the present invention in an assembled state. FIG. 3 is an exploded perspective view of a wear compensation device according to an exemplary embodiment of the present invention. FIG. 4 is an exploded perspective view of principal parts of a wear compensation device according to an exemplary embodiment of the present invention.

As shown in FIG. 1, FIG. 2, FIG. 3, and FIG. 4, a wear compensation device of a clutch actuator 111 according to an exemplary embodiment of the present invention includes a housing 113, a compensation screw 101, a screw guider 103, a wear a compensation nut 105, a wear compensation ring 107, and a rotation guide block 109.

The compensation screw 101 is formed as a hollow shape, and disposed in the housing 113 of the clutch actuator 111 to be movable along a longitudinal direction of a pull-rod 117 that penetrates the compensation screw 101 and operates a clutch according to a driving unit 115 of the clutch actuator 111.

The pull-rod 117 outwardly protrudes from the housing 113, and is provided with a locking portion 117a supported by the compensation screw 101 such that, when the compensation screw 101 moves rearward thereof, i.e., toward an internal of the housing 113, the compensation screw 101 supports the locking portion 117a to draw the pull-rod 117 rearward.

An external end portion of the pull-rod 117 is connected to a clutch fork and delivers a driving torque of the driving unit 115 to engage or release a clutch.

The screw guider 103 and the wear compensation nut 105 are coupled to an external circumference of the compensation screw 101. The wear compensation ring 107 is coupled to an external circumference of the wear compensation nut 105. The rotation guide block 109 is coupled to an external circumference of the wear compensation ring 107. The pull-rod 117 penetrates the compensation screw 101.

The screw guider 103 holds the compensation screw 101 to allow movement in a longitudinal direction thereof, and receives the pull-rod 117 penetrating through the screw guider 103. A connection pin 121 to be connected to the link member 119 connected to the driving unit 115 is formed at transverse end portions of the screw guider 103.

The screw guider 103 is forcedly operated by the driving unit 115 through the link member 119 to reciprocally slide in the housing 113.

The driving unit 115 may be realized in various forms to reciprocally move the link member 119, and FIG. 1 shows an exemplary embodiment of the driving unit 115.

According to the driving unit 115 shown in FIG. 1, an operation screw 133 is rotated by a drive motor or to move forward a slider 135, rotating an operation lever 137 clockwise in the drawing, and the link member 119 is forced to move rearward by the rotation of the operation lever 137 acting on an operation shaft 139.

The link member 119 connects the operation shaft 139 forced by the operation lever 137 and the connection pin 121 of the screw guider 103.

That is, the operation shaft 139 is coupled to one end portion of the link member 119 through pin engagement, and the connection pin 121 is coupled to another end portion of the link member 119 through pin engagement. Accordingly, the operation shaft 139 and the screw guider 103 reciprocate together by the link member 119. The link member 119 is disposed at respective transverse end portions of the operation shaft 139 and the screw guider 103.

According to such a driving unit 115, when the drive motor or is operated, the operation lever 137 rotates by the slider 135 to move the operation shaft 139 rearward thereof, and accordingly, the screw guider 103 together with the link member 119 moves rearward thereof.

Forward movement of the screw guider 103 is made by a restoring force of a clutch applied to the pull-rod 117.

The screw guider 103 is formed as a hollow shape, and slidably receives the compensation screw 101 in the screw guider 103. A guide surface 103a of a flat surface is formed in an internal of the screw guider 103 to allow the compensation screw 101 to move in the longitudinal direction but prevent rotation. The compensation screw 101 is formed with contacting surface 101a that contacts the guide surface 103a.

That is, the guide surface 103a and the contacting surface 101a are formed as flat surfaces and surface-contact with each other, and thereby the compensation screw 101 is reciprocally movable in an operation direction of the pull-rod 117 but fixed in a rotation direction thereof.

The wear compensation nut 105 is supported by an internal end portion of the screw guider 103, and screw-engaged with the compensation screw. Catching teeth 123 of a saw-tooth shape are formed along an external circumference of the wear compensation nut 105.

When the wear compensation nut 105 rotates in a state supported by the screw guider 103, the compensation screw 101 linearly slides along the longitudinal direction thereof.

That is, movement of the wear compensation nut 105 is limited by being supported by an internal end portion of the screw guider 103. When the screw guider 103 moves rearward by the link member 119, the wear compensation nut 105 also moves rearward thereof. When the wear compensation nut 105 rotates while being abutted by the screw guider 103, the compensation screw 101 is relatively moved with respect to the screw guider 103 by a wear compensation stroke.

When the pull-rod 117 is forwardly moved by a restoring force of a clutch, the wear compensation nut 105 is moved together with the compensation screw 101, also moving the screw guider 103 together.

The wear compensation ring 107 is formed as an annular shape, and coupled with an external circumference of the wear compensation nut 105. Two catching protrusions 125 are formed on an internal circumference of the wear compensation ring 107, symmetrically at radially opposite sides, and the catching protrusions 125 may form a locked state in one circumferential direction with catching teeth 123 formed on the external circumference of the wear compensation nut 105. Furthermore, two rotation guide pins 127 are formed on the external circumference of the wear compensation ring 107, radially opposite sides.

Although an exemplary embodiment of the present invention employs two catching protrusions 125 that are symmetrically formed on the internal circumference of the wear compensation ring 107, the present invention is not limited thereto. The protrusions 125 may be formed on the internal circumference of the wear compensation ring 107 in an appropriate number in consideration of durability and operability.

The catching protrusion 125 may protrude in an angle that matches wide tooth surfaces of the catching teeth 123 formed on the wear compensation nut 105.

While the external circumference of the wear compensation nut 105 is coupled with the wear compensation ring 107, a support ring 129 that supports the wear compensation ring 107 in a width direction of the ring 107 is coupled with the wear compensation nut 105 at both sides. The respective support rings 129 are screw-engaged with respective sides of the wear compensation nut 105.

Although the support rings 129 are screw-engaged with both sides of the wear compensation nut 105 in an exemplary embodiment of the present invention, the present invention is not limited thereto. The support rings 129 may be fixed to both the sides of the wear compensation nut 105 in another scheme, e.g., by welding, bonding, etc.

The rotation guide blocks 109 are fixed, at two locations, to an internal surface of the housing 113 corresponding to the external circumference of the wear compensation ring 107.

A rotation guide groove 131 is formed on an internal side of the rotation guide block 109 that corresponds to the external circumference of the wear compensation ring 107. When the pull-rod 117 is operated to a wear compensation range by the driving unit 115 while the rotation guide pin 127 is inserted into the rotation guide groove 131, the rotation guide block 109 guides the wear compensation ring 107 to rotate by a predetermined angle.

An internal surface of the rotation guide block 109 is formed as a curved surface corresponding to the external circumference of the wear compensation ring 107.

Each rotation guide groove 131 includes a straight range 131a and a slant range 131b. The slant range 131b is connected to and forms angle θ with the straight range 131a. The straight range 131a is formed in an axial direction and enables the wear compensation ring 107 to be rotationally fixed, by holding the rotation guide pin 127 at a same position in rotation direction thereof. The slant range 131b guides the wear compensation ring 107 to rotate when the wear compensation ring 107 moves along the axis, i.e., along the width direction of the wear compensation ring 107.

The slant range 131b of the rotation guide groove 131 forms an angle θ with the straight range 131a such that, when the rotation guide pin 127 travels along the slant range 131b, the catching protrusions 125 of the wear compensation ring 107 is rotated by one pitch of the catching teeth 123 of the wear compensation nut 105.

Wear compensation operation of a wear compensation device of a clutch actuator according to an exemplary embodiment of the present invention is hereinafter described with reference to FIG. 5.

Figure 5:
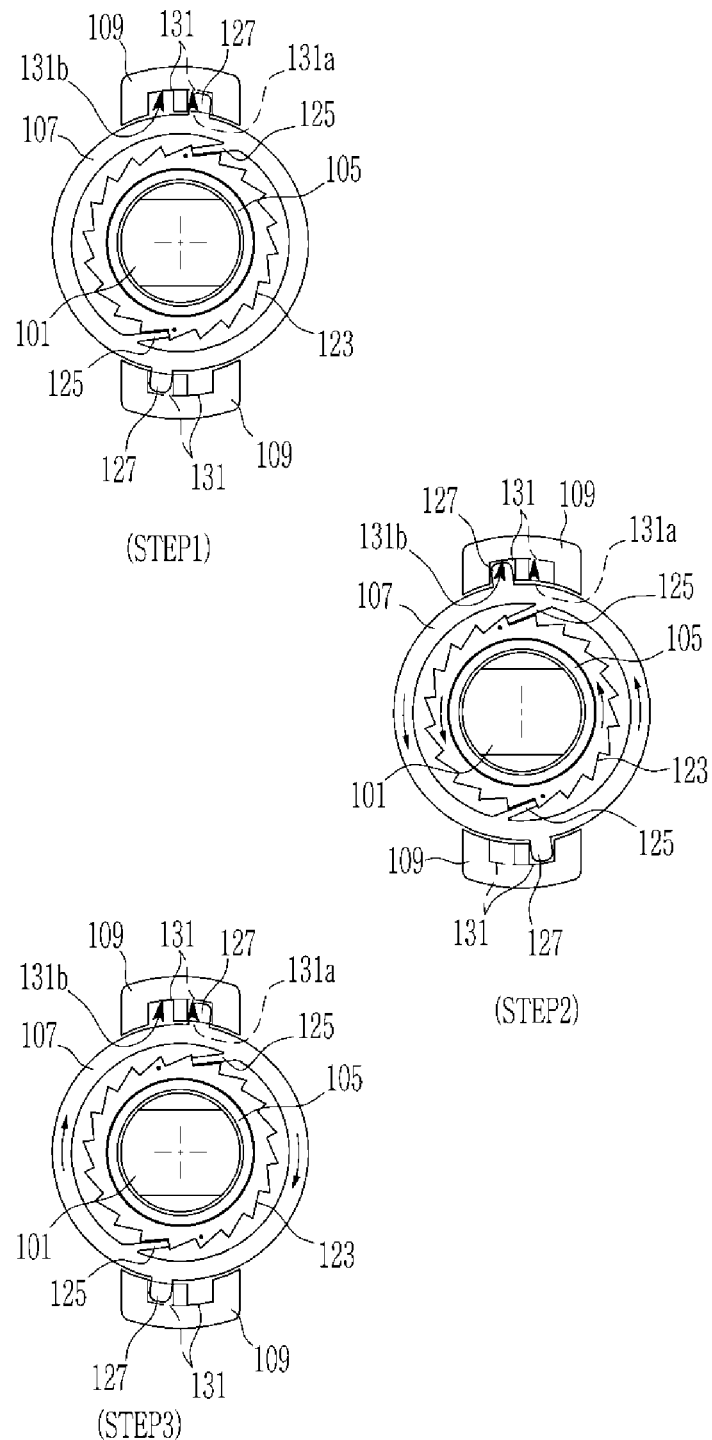
FIG. 5 illustrates wear compensation operation of a wear compensation device according to an exemplary embodiment of the present invention.

FIG. 5 illustrates wear compensation operation of a wear compensation device according to an exemplary embodiment of the present invention.

Referring to STEP 1 of FIG. 5, by the operation of the driving unit 115 under a normal state, the rotation guide pin 127 on the wear compensation ring 107 only moves within the straight range 131a of the rotation guide groove 131 formed on the rotation guide block 109. Therefore, the clutch may be operated by normal reciprocal operation of the pull-rod 117.

In the case of wear compensation operation, as shown in STEP 2 of FIG. 5, the driving unit 115 is operated to draw the pull-rod 117 rearward by a full stroke for wear compensation. Therefore, the rotation guide pin 127 on the wear compensation ring 107 moves along the slant range 131b, going further from the straight range 131a of the rotation guide groove 131 formed on the rotation guide block 109. Accordingly, the wear compensation ring 107 is rotated and thereby the wear compensation nut 105 is also rotated by one pitch of the catching teeth 123.

That is, the protruding end portion of the catching protrusion 125 pushes a narrow tooth surface of the catching teeth 123 of the wear compensation nut 105, and therefore, the wear compensation ring 107 rotates in one direction thereof, i.e., counterclockwise in the drawings, together with the wear compensation nut 105.

As such, the wear compensation nut 105 rotates by one pitch of the catching teeth 123 with respect to the compensation screw 101, and therefore, the compensation screw 101 slides into the screw guider 103, compensating the play by wear of a clutch.

When the wear compensation operation is finished, as shown in STEP 3 of FIG. 5, the pull-rod 117 is operated again by the restoring force of the clutch. As such, the rotation guide pin 127 on the wear compensation ring 107 escapes from the slant range 131b of the rotation guide groove 131 formed on the rotation guide block 109 and moves along the straight range 131a. Accordingly, the wear compensation ring 107 rotates in an opposite direction thereof, i.e., clockwise in the drawings.

In the instant case, the catching protrusion 125 of the wear compensation ring 107 runs over the wide tooth surface of a currently corresponding catching tooth 123 of the wear compensation nut 105, and is positioned to a subsequent catching tooth 123. Now, the rotation guide pin 127 on the wear compensation ring 107 moves within the straight range 131a of the rotation guide groove 131 formed on the rotation guide block 109, and the pull-rod 117 is operated within normal reciprocal operation.

While the present invention has been described in connection with what is presently considered to be practical exemplary embodiments of the present invention, it is to be understood that the invention is not limited to the disclosed exemplary embodiments of the present invention, but, On the other hand, is directed to cover various modifications and equivalent claims as well as various alternatives and modifications thereof. It is intended that the scope of the invention be defined by the Claims appended hereto and their equivalents.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described, to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wear compensation device of a clutch actuator, the wear compensation device comprising:
    a compensation screw disposed in a housing to be movable along a longitudinal direction of a pull-rod that penetrates the compensation screw and operates a clutch according to a driving unit of the clutch actuator;
    a screw guider holding the compensation screw to allow movement in the longitudinal direction of the pull-rod, receiving the pull-rod penetrating through the screw guider, and having a connection pin connected to first and second link members at first and second traverse sides of the screw guider, wherein the first and second link members are connected to the driving unit;
    a wear compensation nut supported by the screw guider, screw-engaged with the compensation screw, and having catching teeth of a saw-tooth shape formed along an external circumference of the wear compensation nut;
    a wear compensation ring formed as an annular shape, coupled with the external circumference of the wear compensation nut, having a plurality of catching protrusions formed on an internal circumference of the wear compensation ring to form a locked state with at least one of the catching teeth in one circumferential direction of the wear compensation nut, and having at least one rotation guide pin on an external circumference of the wear compensation ring; and
    at least a rotation guide block fixed to an internal surface of the housing, having a rotation guide groove on an internal surface of the at least a rotation guide block to receive the at least one rotation guide pin, and guiding the at least one rotation guide pin to rotate the wear compensation ring when the pull-rod is operated to a wear compensation range.

2. The wear compensation device of claim 1, wherein a support ring is coupled with each of a first side and a second side of the wear compensation nut to support the wear compensation ring in a width direction of the support ring.

3. The wear compensation device of claim 2, wherein the support ring is screw-engaged with each of the first side and the second side of the wear compensation nut.

4. The wear compensation device of claim 1, wherein the plurality of catching protrusions is symmetrically formed on the internal circumference of the wear compensation ring.

5. The wear compensation device of claim 1, wherein the plurality of catching protrusions is protrudingly formed in an angle that matches wide tooth surfaces of the catching teeth on the wear compensation nut.

6. The wear compensation device of claim 1, wherein the internal surface of the at least a rotation guide block is formed as a curved surface corresponding to the external circumference of the wear compensation ring.

7. The wear compensation device of claim 1, wherein the rotation guide groove includes:
    a straight range facilitating the wear compensation ring to be rotationally fixed; and
    a slant range guiding the wear compensation ring to rotate.

8. The wear compensation device of claim 7, wherein the slant range of the rotation guide groove forms an angle with respect to the straight range such that, when the rotation guide pin travels along the slant range, the catching protrusions of the wear compensation ring are rotated by one pitch of the catching teeth of the wear compensation nut.

9. The wear compensation device of claim 1, wherein an end of the pull-rod is provided with a locking portion supported by the compensation screw such that, when the compensation screw moves toward an internal of the housing, the compensation screw supports the locking portion to draw the pull-rod toward the internal of the housing.

* * * * *